J. W. HOLT.
METHOD OF AND APPARATUS FOR ELECTRIC WELDING.
APPLICATION FILED APR. 24, 1916.
1,334,756.
Patented Mar. 23, 1920.
4 SHEETS—SHEET 3.
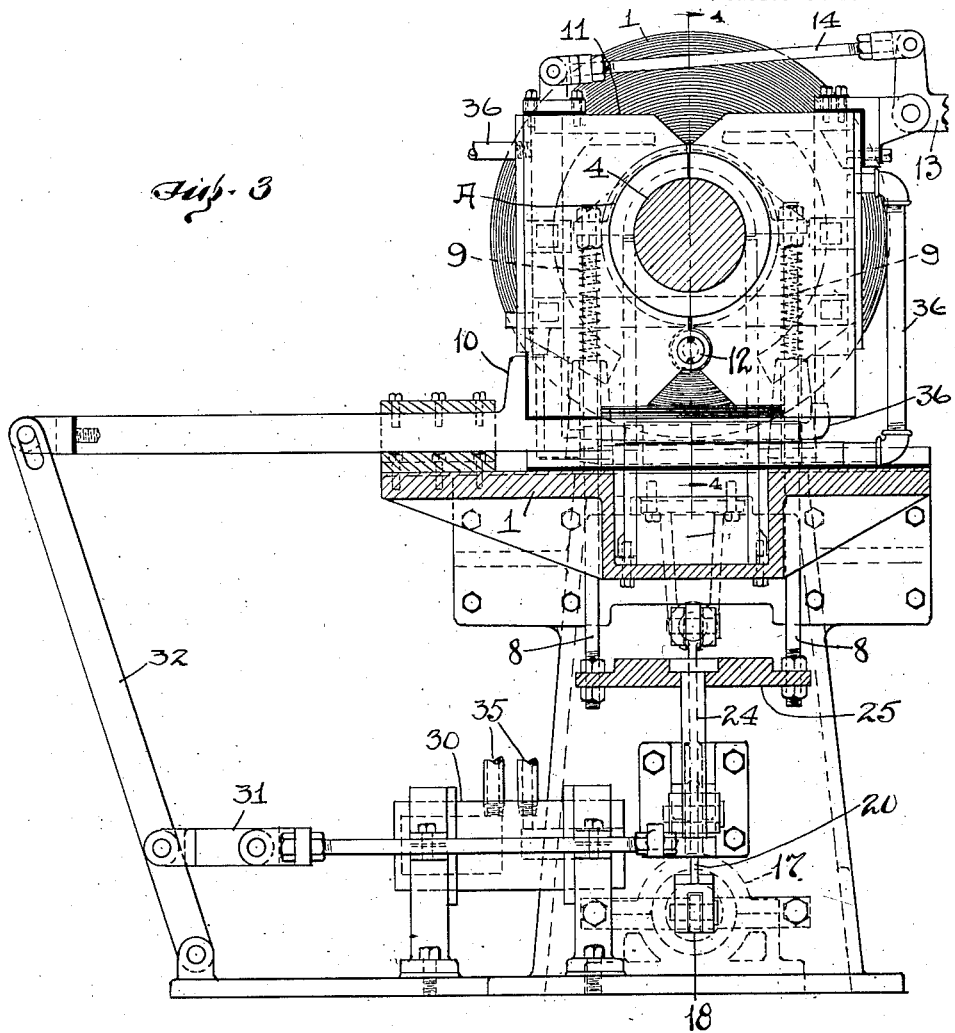

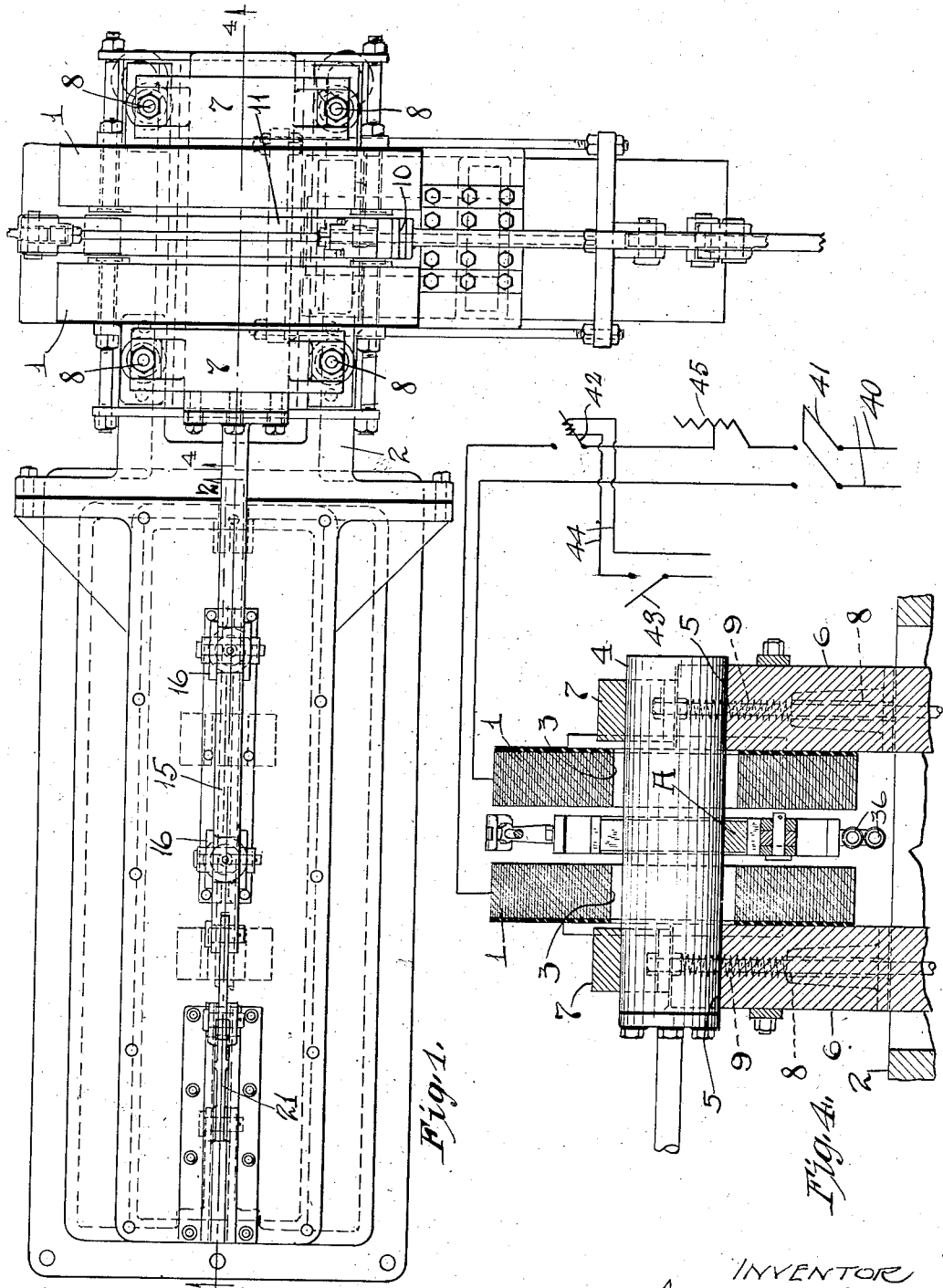

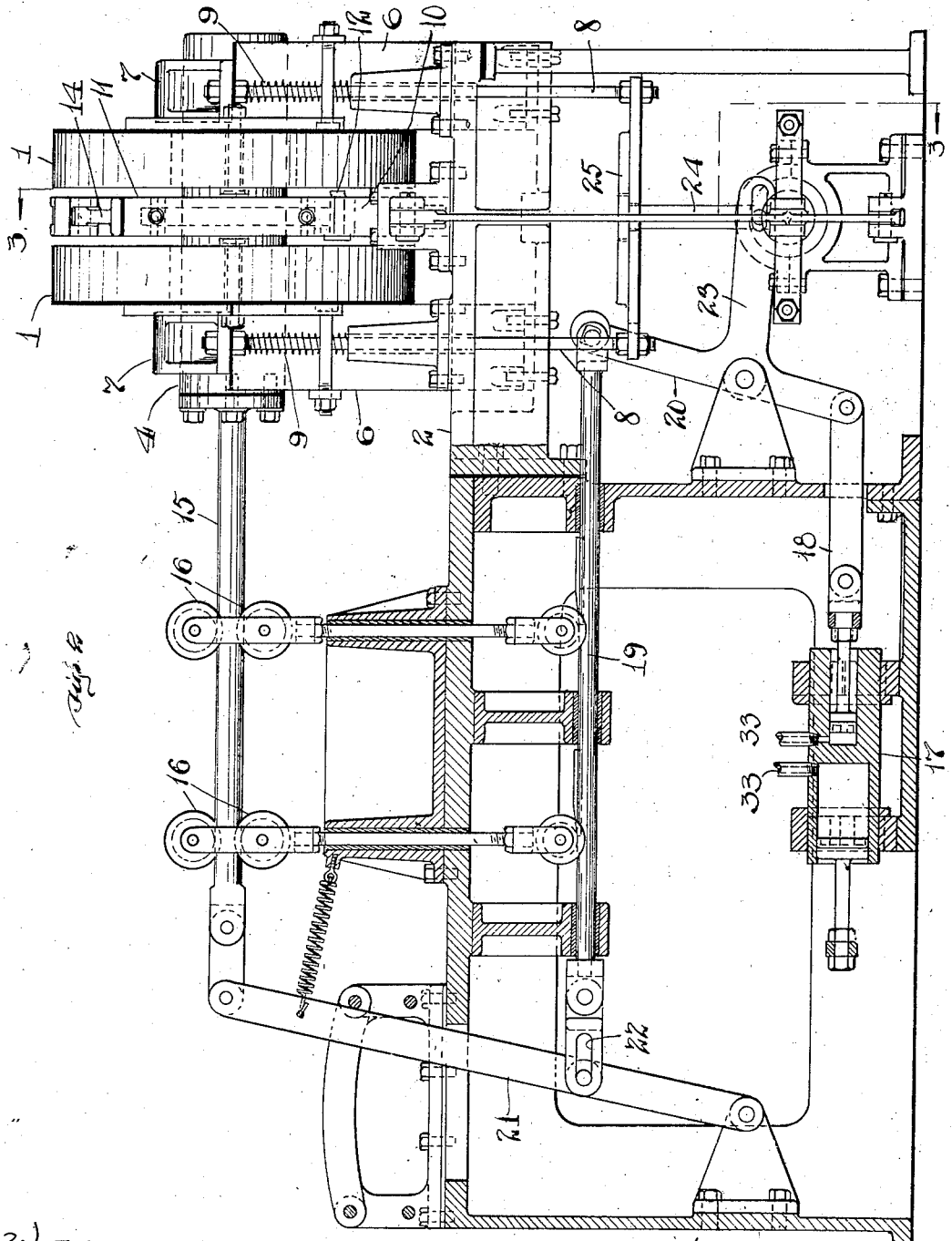

J. W. HOLT.
METHOD OF AND APPARATUS FOR ELECTRIC WELDING.
APPLICATION FILED APR. 24, 1916.
1,334,756.                      Patented Mar. 23, 1920.
4 SHEETS—SHEET 4.
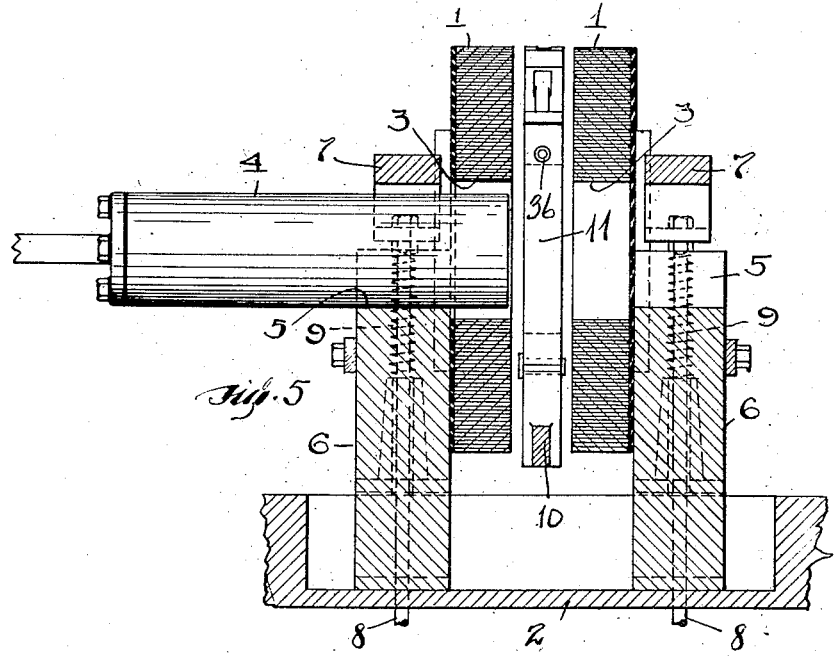
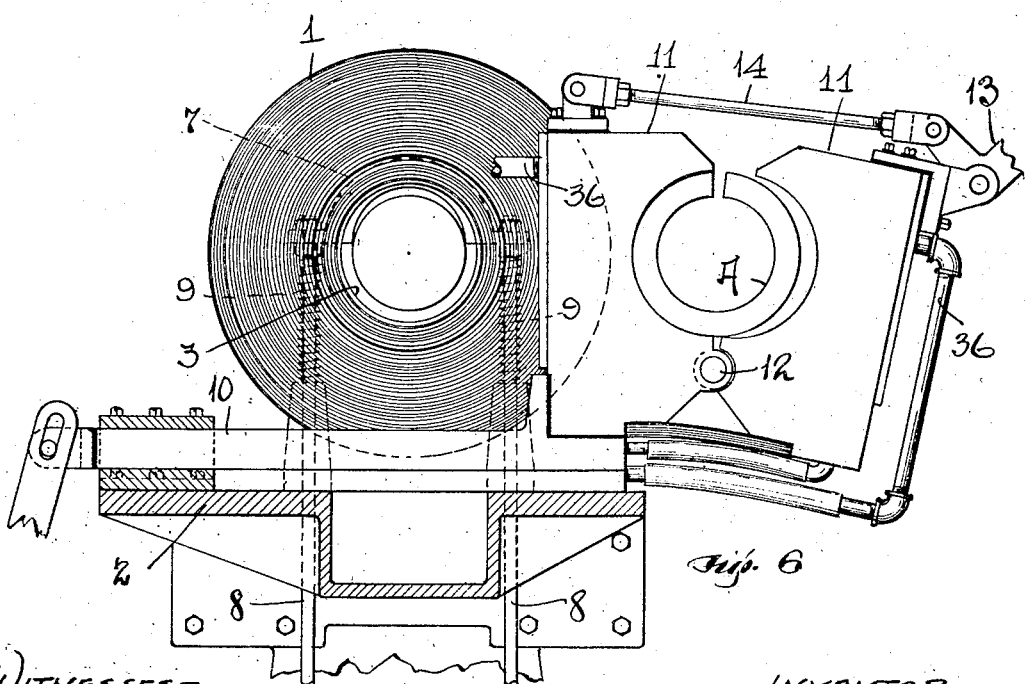
WITNESSES=
O. M. Kappler
Thos. H. Fay
INVENTOR
John W. Holt
BY Fay, Oberlin & Fay
ATTORNEYS

UNITED STATES PATENT OFFICE.

JOHN W. HOLT, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

METHOD OF AND APPARATUS FOR ELECTRIC WELDING.

1,334,756.  Specification of Letters Patent.  Patented Mar. 23, 1920.

Application filed April 24, 1916. Serial No. 93,076.

*To all whom it may concern:*

Be it known that I, JOHN W. HOLT, a citizen of the United States, and a resident of Cleveland, county of Cuyahoga, and State of Ohio, have invented a new and useful Improvement in Methods of and Apparatus for Electric Welding, of which the following is a specification, the principle of the invention being herein explained and the best mode in which I have contemplated applying that principle, so as to distinguish it from other inventions.

As is well known, the current practice in the electric welding art, where it is desired to weld together the edges of a preliminarily formed tube or of a preliminarily formed band, is to bring suitable electrodes into contact with such tube or band adjacent the respective edges or ends thereof, and then forcefully press such edges or ends together; whereupon the current passing from the one electrode to the other across the seam, will fuse the metal and cause a homogeneous juncture. This method is entirely practicable where the metal composing the article being thus welded is of iron or approximately equivalent resistance, for in such case, even where the diameter of the article is relatively small, the easiest path of flow for the current will nevertheless be across the seam instead of around the article. However, when it is attempted to weld articles of the kind just referred to, composed of copper or other metal of approximately equal conductivity, as may be apprehended, the current finds an easy path around the article, and unless such current be applied in wasteful volume, no adequate heating effect at the seam will be secured.

The object of the present invention is the provision of a method, and apparatus for use in connection therewith, whereby articles of the class last described may be welded with practically the same degree of efficiency and expedition as iron tubing and bands are at present being welded. To this end, I provide for the induction of the heating electric current directly in the article in question and the jaws and dies holding the same, and in this way positively control its direction of flow, so that it must of necessity pass across the seam, and by reason of the concentration of the entire current in the article at this point, produce the requisite welding temperature. To the accomplishment of the foregoing and related ends, the invention, then, consists of the steps and means hereinafter fully described and particularly pointed out in the claims.

The annexed drawings and the following description set forth in detail certain steps and mechanism embodying the invention, such disclosed means constituting, however, but one of various ways in which the principle of the invention may be used.

In said annexed drawings:—

Figure 1 is a plan view of an apparatus adapted to carry out my present improved process, or method of electric welding; Fig. 2 is a side elevational view of such apparatus with parts appearing in section, the plane of the section being indicated by the line 2—2, Fig. 1; Fig. 3 is a transverse cross section and end elevation of the apparatus, the plane of the section being indicated by the line 3—3, Fig. 2; Fig. 4 is a longitudinal central section of the welding mechanism proper, forming a part of such apparatus, the plane of the section being indicated by the lines 4—4, Figs. 1 and 3, respectively, said figure also including a diagrammatic representation of the circuit connections of the apparatus; Fig. 5 is a sectional view similar to that of Fig. 4, but showing the parts in a different operative position; and Fig. 6 is a transverse sectional view of the welding mechanism proper, corresponding with the view shown in Fig. 3, and likewise showing certain other parts in a different operative position.

Referring to the welding mechanism proper, as constituting the essential part of the apparatus, this will be seen to comprise two transformer coils 1, 1, of more or less familiar construction, such coils being preferably formed out of flat strip copper and being connected in series. These coils are mounted in parallel spaced relation upon a suitable base 2 of non-magnetic material. These coils have a common axis which is preferably horizontally disposed, although not necessarily so, while the details of their external connections, as well as of their interconnection and insulation from the supporting parts, obviously need not be described in detail. Any desired number of coils, either one or more may be used if properly arranged.

Each of said coils 2 has a central opening 3 of sufficient diameter to permit the free movement therethrough of a longitudinally reciprocable mandrel or core 4, this core having an external diameter somewhat smaller than the internal diameter of the ring A, or other similar article, the ends of which it is desired to weld together. In its operative position, said mandrel is disposed as illustrated in Fig. 4 so as to allow its respective ends to rest in journals 5 provided in suitable supporting standards 6 that form part of the complete transformer magnet or core, which in turn is fastened to the general machine frame. The upper halves 7 of such journals are vertically movable by means of rods 8 connected therewith, compression springs 9 serving normally to lift the same sufficiently to allow the mandrel to be moved without interference. In the operative position, however, of the latter, as illustrated in Fig. 4 just referred to, these clamps are drawn downwardly so as to firmly hold the mandrel in place, thereby completing the assembling of the magnet.

Mounted on a slide 10, so as to be transversely reciprocable in the space between the two transformer coils, is a die clamp preferably comprising two jaws 11, 11 pivotally connected together at 12, and adapted to be opened, or closed, as desired, by means of a handled lever 13 mounted on the one such jaw, and connected with the other by means of a link 14. The opening in such jaws, as shown in Fig. 6, is adapted to receive and loosely hold the copper ring A, or other article to be welded, in the open position of said jaws. When the latter, however, are forced together by operation of the aforesaid handle 13, said ring is not only firmly clamped between the jaws but its split ends are brought more or less closely together.

The jaws 11, with the article loosely held therein, are not thus drawn together until the slide 10 has been moved in between the coils, so as to bring the ring A in substantially axial alinement with said coils and with the reciprocable mandrel or transformer core 4. Accordingly when the mandrel is moved into operative position, as previously described, it will pass through the article, and thus, when the jaws of the die are closed, the ends of such article are brought together to form the weld.

For effecting operation of the mandrel and of the slide 10, carrying the die just described, in proper sequence, any desired means may be provided, or of course such operation may be manually performed, just as it is contemplated that the jaws of the die should be drawn together by hand. However, in Figs. 1, 2 and 3 will be found illustrated one approved arrangement of operating mechanism.

As thus illustrated such mechanism includes a rod 15 directly connected to but electrically insulated from the one end of the mandrel, said rod being suitably supported and guided on rollers 16 alined with the axes of the transformer coils. Reciprocation of this rod is designed to be secured from a suitable motor 17, preferably of the hydraulic plunger type, located in the base of the machine and having a differential piston, which is connected with said rod through a series of connecting rods 18 and 19 and levers 20 and 21, there being a lost motion connection with a vertical plunger 24. On the upper end of the latter is in turn mounted a plate 25 to which the vertically reciprocable rods 8 for operating the clamps 7, are attached.

By reason of the lost motion connection 22, it will be seen that, upon the differential piston in the motor-cylinder being moved to the right from the position shown in Fig. 2, the initial effect will be to raise the clamps 7 and thereupon to slightly raise and withdraw the mandrel 4, moving the same from the position shown in Fig. 4 to that in Fig. 5. The reverse operation of the piston will of course produce a reverse movement of these parts in reverse order.

For operating the slide 10 which carries the sectional die or work-holder, a second hydraulic cylinder 30 with differential piston therein, is provided as best shown in Fig. 3, said piston being connected with the slide through the medium of a connecting rod 31 and lever 32 as will be readily understood, so that when the piston is moved to the right from the position shown in Fig. 3, the slide will be moved from the operative position shown in said figure, to its inoperative or work-receiving position as shown in Fig. 6, and vice versa.

The connections 33, 33 and 35, 35, for the several hydraulic cylinders constituting a part of the operating mechanism of the apparatus, are merely indicated, it being understood that suitable control valves will be located where most convenient for the operator's use, just as an electric switch will be provided in the transformer circuit. It should also be explained that the die parts 11 are preferably hollow and provision made by means of connections 36, as indicated in Figs. 3 and 6 for circulating water or other cooling liquid therethrough, such connections being flexible to permit the opening and closing of the die parts as described above.

The wiring connections, as previously indicated, are diagrammatically shown in connection with Fig. 4. Thus the transformer coils 1, 1 are connected in series in an A—C welding circuit 40 controlled by a manually operable switch 41 and a magnetic switch 42, operated from a master switch 43 in a D—C circuit 44. The A—C circuit also includes a variable resistive 45.

The complete sequence of operations of the apparatus and the general principle of the method exemplified in such operation, may now be briefly set forth.

Following the insertion of the ring A to be welded between the open jaws 11 of the die, as shown in Fig. 6, and the movement of the slide to carry such die into the operative position shown in Fig. 3, the mandrel is advanced into its operative position as shown in Fig. 4. Thereupon the die jaws are closed and the electric current passed through the transformer coils. These, as explained, constitute the primary coils of a transformer, the secondary of which will consist of the article itself, which is being welded, or rather such article and the jaws of the die. Such jaws, however, never come together completely so as to close the electric circuit, and the induced current, accordingly, has to find its path in the article, or copper ring, to be specific. Such induced current of course has a predetermined and positive direction, and so of necessity is forced across any slight gap that exists at the junction line between the ends of the ring. The additional resistance there encountered, as previously indicated, is sufficient to quickly bring the ends to a welding temperature, just as in the case of the prevailing method of welding iron rings, or other like articles.

As the ends begin to fuse, a slight additional pressure may be placed upon the article by drawing the dies closer together, until the ring, in other words, closely hugs the mandrel. The ends are thus interfused, or homogeneously united together, and the current may accordingly be turned off. As soon as the welding step has been completed, such mandrel is withdrawn longitudinally, and the slide carrying the completed ring may be thereupon moved clear of the coils, the jaws of the die opened, and such completed ring replaced with a fresh one to be operated upon.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:

1. The method of welding metallic articles together which consists in maintaining said articles in contact under pressure at the point to be welded, placing such articles in the relation of a secondary laterally adjacent to the primary coil of a transformer and then passing a current through such primary coil, whereby a heating electric current is induced in such articles having a direction of flow across such point of contact.

2. The method of welding metallic articles together which consists in maintaining said articles in contact under pressure along the line to be welded, placing such articles in the relation of a secondary laterally adjacent to the primary coil of a transformer, and then passing a current through such primary coil, whereby a heating electric current is induced in such articles having a direction of flow across the line to be welded.

3. The method of welding together the ends of a preliminarily formed tubular article or band which consists in maintaining the ends thereof in contact under pressure, placing such article in the relation of a secondary laterally adjacent to the primary coil of a transformer, and then passing a current through such primary coil, whereby a heating electric current is induced in such article having a direction of flow across such ends.

4. The method of welding metallic articles together which consists in maintaining said articles in contact under pressure at the point to be welded, placing such articles in the relation of a secondary between two alined, axially spaced primary coils of a transformer, and then passing a current through such primary coils, whereby a heating electric current is induced in such articles having a direction of flow across such point of contact.

5. The method of welding metallic articles together which consists in maintaining said articles in contact under pressure at the point to be welded, placing such articles in the relation of a secondary between two alined axially spaced series connected primary coils of a transformer, and then passing a current through such primary coils, whereby a heating electric current is induced in such articles having a direction of flow across such point of contact.

6. The method of welding metallic articles together which consists in maintaining said articles in contact under pressure along the line to be welded, placing such articles in the relation of a secondary between two alined, axially spaced primary coils of a transformer, such line being parallel with the common axis of said coils, and then passing a current through such primary coils, whereby a heating current is induced in such articles having a direction of flow across the line to be welded.

7. The method of welding metallic articles together which consists in maintaining said articles in contact under pressure along the line to be welded, placing such articles in the relation of a secondary between two alined, axially spaced series connected primary coils of a transformer, such line being parallel with the common axis of said coils, and then passing a current through such primary coils, whereby a heating current is induced in such articles having a direction of flow across the line to be welded.

8. The method of welding together the ends of a preliminarily formed tubular article or band which consists in maintaining the ends thereof in contact under pressure, placing such article in the relation of a secondary between two alined, axially spaced primary coils of a transformer, and then passing a current through such primary coils whereby a heating electric current is induced in such article having a direction of flow across such ends.

9. The method of welding together the ends of a preliminarily formed tubular article or band which consists in maintaining the ends thereof in contact under pressure, placing such article in the relation of a secondary between two alined, axially spaced series connected primary coils of a transformer, and then passing a current through such primary coils whereby a heating electric current is induced in such article having a direction of flow across such ends.

10. The method of welding together the ends of a preliminarily formed tubular article or band which consists in clamping said article about a suitable mandrel so as to bring the ends thereof in contact under pressure, placing such mandrel with the article thereon in the relation of a secondary laterally adjacent to the primary coil of a transformer, and then passing a current through such primary coil, whereby a heating electric current is induced in such article having a direction of flow across the ends thereof.

11. The method of welding together the ends of a preliminarily formed tubular article or band which consists in clamping said article about a suitable mandrel so as to bring the ends thereof in contact under pressure, placing such mandrel with the article thereon in the relation of a secondary laterally adjacent to two primary coils of a transformer, and then passing a current through such primary coil, whereby a heating electric current is induced in such article having a direction of flow across the ends thereof.

12. The method of welding together the ends of a preliminarily formed tubular article or band which consists in clamping said article about a suitable mandrel so as to bring the ends thereof in contact under pressure, placing such mandrel with the article thereon in the relation of a secondary between two alined, axially spaced series connected primary coils of a transformer, and then passing a current through such primary coil, whereby a heating electric current is induced in such article having a direction of flow across the ends thereof.

13. In apparatus of the character described the combination with two primary coils of a transformer; of means adapted to hold and maintain articles in contact under pressure at the point to be welded between and in the position of a secondary to said primary coils.

14. In apparatus of the character described the combination with two primary coils of a transformer; of a movable clamp adapted to receive and maintain the articles in contact under pressure at the point to be welded, said clamp being adapted in one position to bring such articles between and in the relation of a secondary to said primary coils.

15. In apparatus of the character described the combination with two primary coils of a transformer; of a clamp adapted to receive and hold a preliminarily formed tubular article or band with the ends thereof in contact under pressure, said clamp being adapted between and in one position to bring such article in the relation of a secondary to said primary coils.

16. In apparatus of the character described, the combination with the primary coil of a transformer; of a clamp movable transversely of the axis of said transformer and adapted to receive and maintain a preliminarily formed tubular article or band with the ends thereof in contact under pressure, said clamp being adapted in one position to bring such article in the relation of a secondary to said primary coil.

17. In apparatus of the character described, the combination with two alined, axially spaced primary coils of a transformer; of a clamp movable between and transversely of the common axis of said coils and adapted to receive and hold a preliminarily formed tubular article or band with the ends thereof in contact under pressure, said clamp being adapted in one position to bring such article in the relation of a secondary to said primary coils.

18. In apparatus of the character described, the combination with the primary coil of a transformer; of a clamp movable transversely of the axis of said transformer and adapted to receive and maintain a preliminarily formed tubular article or band with the ends thereof in contact under pressure, said clamp being adapted in one position to bring such article in the relation of a secondary to said primary coil; and a mandrel movable longitudinally of the axis of said primary coil into position within such article when in the relation stated.

19. In apparatus of the character described, the combination with two alined, axially spaced primary coils of a transformer; of a clamp movable between and transversely of the common axis of said coils and adapted to receive and hold a preliminarily formed tubular article or band with the ends thereof in contact under pressure, said clamp being adapted in one position to bring such article in the relation of a secondary to said primary coils; and a mandrel movable longitudinally of the axis of said coils into position within such article when in the relation stated.

Signed by me this 15th day of April, 1916.

JOHN W. HOLT.

Attested by—
M. H. WILLIAMS,
R. C. COOLEY.